United States Patent
Coddington et al.

(10) Patent No.: US 12,335,134 B2
(45) Date of Patent: Jun. 17, 2025

(54) NETWORK-ON-CHIP (NoC) WITH A BROADCAST SWITCH SYSTEM

(71) Applicant: ARTERIS, INC., Campbell, CA (US)

(72) Inventors: John Coddington, Cedar Park, TX (US); Boon Chuan, Scotts Valley, CA (US)

(73) Assignee: ARTERIS, INC., Campbell, CA (US)

( * ) Notice: Subject to any disclaimer, the term of this patent is extended or adjusted under 35 U.S.C. 154(b) by 0 days.

(21) Appl. No.: 18/233,872

(22) Filed: Aug. 14, 2023

(65) Prior Publication Data
US 2023/0388216 A1    Nov. 30, 2023

Related U.S. Application Data

(62) Division of application No. 17/138,374, filed on Dec. 30, 2020, now Pat. No. 11,729,088.

(51) Int. Cl.
| | |
|---|---|
| *H04L 45/02* | (2022.01) |
| *H04L 49/00* | (2022.01) |
| *H04L 49/109* | (2022.01) |
| *H04L 45/60* | (2022.01) |

(52) U.S. Cl.
CPC ............ *H04L 45/02* (2013.01); *H04L 49/109* (2013.01); *H04L 49/30* (2013.01); *H04L 45/60* (2013.01)

(58) Field of Classification Search
CPC ....... H04L 45/02; H04L 49/109; H04L 49/30; H04L 45/60; H04L 45/16; H04L 49/201; H04L 49/25; H04L 49/505
See application file for complete search history.

(56) References Cited

U.S. PATENT DOCUMENTS

| | | | |
|---|---|---|---|
| 6,437,804 B1 * | 8/2002 | Ibe ..................... | G06F 30/18 |
| | | | 709/223 |
| 7,664,110 B1 * | 2/2010 | Lovett ................ | H04L 67/1097 |
| | | | 370/422 |
| 10,097,467 B1 * | 10/2018 | Singh ................... | H04L 12/18 |
| 10,616,063 B1 * | 4/2020 | Dutta ................... | H04L 65/611 |
| 10,707,875 B1 | 7/2020 | Orthner et al. | |
| 10,708,167 B2 * | 7/2020 | Jiang ................... | H04L 45/02 |
| 2005/0013310 A1 * | 1/2005 | Banker ................. | H04L 45/02 |
| | | | 370/467 |

(Continued)

OTHER PUBLICATIONS

Lei Wang et al: "Recursive partitioning multicast: A bandwidth-efficient routing for Networks-on-Chip", Networks-on-Chip, 2009. NOCS 2009. 3rd ACM/IEEE International Symposium On, IEEE, Piscataway, NJ, USA, May 10, 2009 (May 10, 2009), pp. 64-73, XP031472793, ISBN: 978-1-4244-4142-6.

*Primary Examiner* — Eunsook Choi
(74) *Attorney, Agent, or Firm* — Jubin Dana; Dana Legal Services

(57) ABSTRACT

A system and methods of use for a broadcast switch system, broadcast management switching system, and methods of use in network-on-chip are presented. The invention relates generally to broadcasting transactions in a network-on-chip (NoC). More specifically, and without limitation, the invention provides for transacting from master to multiple slaves and for receiving responses. The invention relates to a broadcast switch for broadcasting transactions. More specifically, and without limitation, the invention relates to a broadcast switch system, broadcast management switching system, and methods of use in NoC.

6 Claims, 14 Drawing Sheets

(56) References Cited

U.S. PATENT DOCUMENTS

| | | | |
|---|---|---|---|
| 2008/0219237 A1* | 9/2008 | Thubert | H04L 45/46 |
| | | | 370/349 |
| 2018/0375799 A1* | 12/2018 | Liu | H04L 12/1886 |
| 2018/0375968 A1* | 12/2018 | Bashandy | H04L 45/741 |
| 2019/0104058 A1* | 4/2019 | Filsfils | H04L 41/0246 |
| 2020/0120020 A1* | 4/2020 | Dutta | H04L 45/04 |
| 2021/0044513 A1* | 2/2021 | Ronen | H04L 45/38 |
| 2021/0258252 A1* | 8/2021 | Olson | H04L 47/29 |
| 2022/0070090 A1* | 3/2022 | Park | H04L 45/38 |
| 2022/0224639 A1* | 7/2022 | Froese | H04L 49/3027 |

* cited by examiner

NETWORK-ON-CHIP (NoC) WITH A BROADCAST SWITCH SYSTEM

CROSS REFERENCE TO RELATED APPLICATIONS

The present application is a division of U.S. Non Provisional application Ser. No. 17/138,374 filed on Dec. 30, 2023 to John CODDINGTON et al. and titled BROADCAST SWITCH SYSTEM IN A NETWORK-ON-CHIP (NoC), the entire disclosure of which is incorporated herein by reference

FIELD OF THE INVENTION

The invention relates generally to broadcasting transactions in a network-on-chip (NoC) and, more specifically, to a broadcast switch for broadcasting transactions in a broadcast management switching system.

The invention relates generally to broadcasting transactions in a network-on-chip (NoC) and, more specifically, to a broadcast switch for broadcasting transactions in a broadcast management switching system.

BACKGROUND

The system creation, design, and development of computer processors includes multiprocessor systems. Multiprocessor systems have been implemented in systems-on-chips (SoCs) that communicate and interact with network-on-chips (NoCs). The SoCs, generally, include instances of master (initiators) intellectual property (IPs) and slave (targets) IPs. In some instances, one master sends a transaction or request to multiple slaves. The transactions are sent using industry standard protocols, such as ARM, AMBA, AXI, AHB, or APB; or OCP-IP. The protocols have a strict request/response semantic, and typically are treated by an NoC as unicast; the master, connected to the NoC, sends a request to a slave, using an address to select the slave. The NoC decodes the address and transports the request from the master to the slave. The slave handles the transaction and sends a response, which is transported back by the NoC to the master.

The modern, and known, application utilized when a master needs to send the same transaction and/or request to multiple slaves, is for the master to send all the requests sequentially. The master sends the transaction to the first slave, then to the second slave, then to the third slave, and so on. For example, if a master wants to write the same data into 16 different slaves, the master sends 16 identical write transactions, in sequence, with one going to each slave. Thus, the time taken by the total operation, the time spent to write one transaction is multiplied by 16, is 16 times the amount of writing a single transaction. This limits the rate at which an identical request can be sent to multiple slaves. In other words, the rate is limited by the rate at which a master can send sequential requests to all the destinations, i.e. the slaves individually. Thus, there is a need for a system and method of use that saves time and can potentially save wires and processing, and the like.

Furthermore, in addition to the number of transactions which occur in the circumstances described above, the method of broadcasting, or the method of sending a transaction from a master to a slave, also requires a switch. In sending master/slave transactions in a network or NoC, switches are used as the gatekeepers for determining which transactions are sent through which ports. In this way, and as is commonly used, the ingress port and the egress port are connected to a switch so that a packet entering the switch has to be decoded, routed, and encoded before exiting the switch. In this way, in modern and known, applications utilize the master, and all transactions being sent to a slave must be written individually, transacted individually through a switch. This requires a great deal of processing and limits capabilities and rates that a master can send sequential requests to all the destinations based on both writing processing and switch availability and processing. Therefore, there is a need in the art for a system and method of use that saves time, transacting power, and enhances transaction efficiency, and the like.

SUMMARY

The invention relates generally to broadcasting transactions in a network-on-chip (NoC). More specifically, and without limitation, the invention relates to a broadcast switch for broadcasting transactions. More specifically, and without limitation, the invention relates to a broadcast switch system, broadcast management switching system, and methods of use in NoC.

The invention provides new systems and methods for broadcasting transactions in a NoC. More specifically, the invention provides the art with a broadcast switch. In other words, the invention provides the state of the art with a new building block for a NoC.

In the arrangements shown, and in this invention, a broadcast switch is presented which serves as a broadcast adapter that also performs the routing functions of a switch. These routing functions, in the invention are performed simultaneously with the transaction broadcast processing, in what results as a much more efficient means of broadcasting transactions and/or sending transactions, particularly with respect to the master/slave relationships that exist in transactions.

Said another way, the invention provides a broadcast adapter to the art which also has switching functionalities. In other words, the mechanism provided can perform transaction broadcasting while also performing switch functions. The broadcast switch, disclosed herein, combines the functionalities of a broadcast adapter and a switch into one unit, which performs transaction broadcast and switching simultaneously. This eliminates many of the transactions that occur in modern processes, especially those related to crossing physical boundaries of an adapter and a switch.

In other words, the systems and methods presented herein simplify the network on chip because of fewer linked, fewer instantiations, and fewer wiring of building blocks, among other advantages. In the arrangement shown herein, as one example, the broadcast switch reduces the number of links required in a broadcast adapter with a switch. Furthermore, the broadcast switch implements route table lookup and port table lookup, and as a result the broadcast switch can broadcast transactions to multiple destinations via the same egress port. For this reason, among others, this new building block and its corresponding functionalities, dramatically increase the capabilities of the egress ports while also requiring fewer egress ports for assembly of the overall system.

Systems that embody the invention, in accordance with the aspects thereof, are typically designed by describing their functions in hardware description languages. Therefore, the invention is also embodied in such hardware descriptions, and methods of describing systems as such hardware descriptions, but the scope of the invention is not limited thereby.

BRIEF DESCRIPTION OF THE DRAWINGS

In order to understand the invention more fully, reference is made to the accompanying drawings or figures. The invention is described in accordance with the aspects and embodiments in the following description with reference to the drawings or figures (FIG.), in which like numbers represent the same or similar elements. Understanding that these drawings are not to be considered limitations in the scope of the invention, the presently described aspects and the presently understood best mode of the invention are described with additional detail through use of the accompanying drawings.

DETAILED DESCRIPTION

Figure 1:
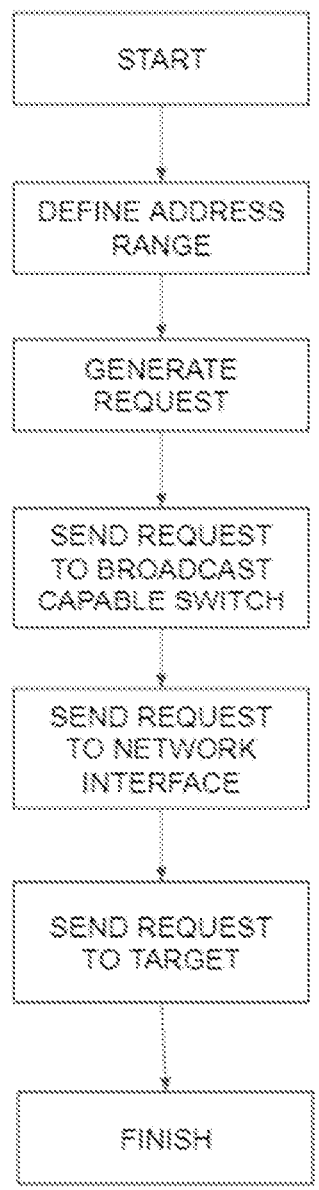
FIG. 1 illustrates a flow process for broadcasting a request from a master to multiple slaves using a broadcast switch in accordance with the aspects and embodiments of the invention.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that mechanical, procedural, and other changes may be made without departing from the spirit and scope of the invention(s). The following detailed description is, therefore, not to be taken in a limiting sense, and the scope of the invention(s) is defined only by the appended claims, along with the full scope of equivalents to which such claims are entitled.

As used herein, the terminology such as vertical, horizontal, top, bottom, front, back, end, sides and the like are referenced according to the views, pieces and figures presented. It should be understood, however, that the terms are used only for purposes of description, and are not intended to be used as limitations. Accordingly, orientation of an object or a combination of objects may change without departing from the scope of the invention.

Reference throughout this specification to "one embodiment," "an embodiment," "one example," or "an example" means that a particular feature, structure, or characteristic described in connection with the embodiment or example is included in at least one embodiment of the invention. Thus, the appearance of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the invention may be embodied as an apparatus, method, or computer program product. Accordingly, the invention may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the invention may take the form of a computer program product embodied in any tangible medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the invention may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("Saas"), Platform as a Service ("PaaS"), and Infrastructure as a Service ("IaaS")), and deployment models (e.g., private cloud, community cloud, public cloud, and hybrid cloud).

As used herein, a "source," a "master," and an "initiator" refer to similar intellectual property (IP) blocks, modules, or units; the terms are used interchangeably within the scope and embodiments of the invention. As used herein, a "sink," a "slave," and a "target" refer to similar IP modules or units and the terms are used interchangeably within the scope and embodiments of the invention. As used herein, a transaction may be a request transaction or a response transaction. Examples of request transactions include write request and read request.

The flowchart and block diagrams in the attached figures illustrate the architecture, functionality, and operation of possible implementations of systems, methods, and computer program products according to various embodiments of the invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

All illustrations of the drawings are for the purpose of describing selected versions of the invention and are not intended to limit the scope of the invention.

The following descriptions are in reference to FIG. 1 through FIG. 14. The invention relates to broadcasting transactions in a network-on-chip (NoC). More specifically, and without limitation, the invention relates to a broadcast switch for broadcasting transactions. More specifically, and without limitation, the invention relates to a broadcast switch system, broadcast management switching system, and methods of use in NoC.

In accordance with some aspects and embodiment of the invention, a component for NoC is disclosed, which is a broadcast capable switch or broadcast switch 20. The broadcast switch 20 implements a new approach to sending a transaction from a master to multiple slaves and/or from multiple masters to multiple slaves. According to the various embodiments and aspects of the invention depicted herein, a special range of addresses can be used. The NoC broadcasts a transaction received at one or more of the special addresses, which is within a special range of addresses. The broadcasted transactions can reach multiple destinations and/or slaves simultaneously instead of sending a broadcasted transaction to a single destination, while also providing switching functionality, and more.

One of many advantages is the efficiency of operation by having a broadcast adapter functionality and switching functionality built into a single, more efficient, handler of transactions. Another advantage, among many, as disclosed herein, is efficiency in the overall operation of broadcast networks and transaction handling that includes sending the same transaction to multiple destinations. Yet another advantage, among many, as disclosed herein, includes the ability to perform functions on a transaction prior to broadcasting the transaction. And another advantage, among many, as disclosed herein, is efficiency in the ability to perform switching functions on a transaction prior to broadcasting the transaction.

In accordance with the various aspects and embodiments of the invention, the system provides a new component that can be used for NoC, particularly a new building block in broadcasting transaction functionality. In accordance with the various aspects and embodiments of the invention, the broadcast switch disclosed herein is a broadcast adapter and performs routing function of a switch when performing a transaction broadcast. In accordance with the various aspects and embodiments of the invention, the broadcast switch combines the functionalities of a broadcast adapter and a switch into one building block. The broadcast switch performs transaction broadcast functionality and switching functionality simultaneously. In this way, this is the first building block component provided for NoC that performs these functionalities simultaneously.

Furthermore, the broadcast switch, disclosed herein, eliminates a number of transaction overheads that incur when crossing the physical boundaries of an adapter and a switch. These physical boundaries may include wires, processing, and increased sizing of NoC design. In this way, the invention eliminates some of the wires, reduces processing delays, and decreases the size of NoC design. These features, and others are achieved through use and implementation of the new building block disclosed herein.

In accordance with the various aspects and embodiments of the invention, the elimination of many transaction overheads that occur as a result of use of the broadcast switch simplifies the NoC because fewer links and fewer instantiations and wirings of building blocks are needed. The broadcast switch disclosed herein reduces, by up to half or at least half, the number of links required in design using a broadcast adapter with a switch. In accordance with some aspects and embodiments of the invention, the broadcast switch can retrieve or lookup route information and port information (for an intended target or slave) from lookup tables based on the rote field of an incoming transaction. In accordance with some aspects and embodiments of the invention, the broadcast switch includes a route computation module to determine route information for a transaction using the route field of the incoming transaction. Thus, the broadcast switch implements route table lookup. The broadcast switch can broadcast transactions to multiple destinations via the various routes, as selected from the route table, by modifying the incoming transaction's route field with the updated routing information. In accordance with some aspects and embodiments of the invention, the incoming transaction is updated, modified, or changes by a modify module of the broadcast switch.

Additionally, because the broadcast switch implements egress table lookup, the broadcast switch can broadcast transactions to multiple destinations via the same egress port. This functionality, among other functionalities and advantages can be useful, and provide enhanced efficiencies, when the number of egress ports are less than the number of destinations, and in many other circumstances, as disclosed herein and contemplated for use.

In accordance with some aspects and embodiment of the invention, the broadcast switch is a multicast switch that sends transactions multiple targets, on the request side, using one egress port. As used herein, the term "transaction" includes and is used interchangeably with: "incoming transactions," "arriving transactions," "departing transactions," "outgoing transactions," "data," "data packets," and "packets."

In accordance with aspects and embodiments of the invention, the broadcast switch also includes buffering sufficient to hold the entire packet because the broadcast switch sends out (broadcasts) transactions or packets serially, especially when the broadcast switch has fewer egress ports than the number to destination, to which it is broadcasting. For example, when the broadcast switch is broadcasting to two or more destination using a one egress port. This approach has the advantage of allowing the source (initiator) to send one request to the broadcast switch and avoid having to individually create the separate requests.

Although the invention may be explained in relation to examples of embodiments, it is to be understood that many other possible modifications and variations can be made without departing from the spirit and scope of the invention.

In accordance with the various aspects and embodiments of the invention, a broadcast management system 10 is shown (hereafter known as "broadcast management system", "broadcast capable switch system", or "broadcast system" or simply "system"). Broadcast management system 10 is formed of any suitable size, shape and design and the scope of the invention is not limited thereby. In the arrangement shown, as one example, system 10 is part of a NoC, shown in accordance with an embodiment of the invention and may also include remote servers, databases, application servers, application databases, application programming interfaces, user databases, event databases, transmission rule databases, rules databases, data transmission components and/or features, mobile applications, and/or computers, cellular transmission, data packets, and the like, that fulfill the functions disclosed herein.

Previous NoC technology required, at best, a plurality of broadcast adapters and a plurality of switches. In these arrangements, the connection, from end-to-end (and in this case master to slave) must go through a switch. The switch computes the route and modifies the route field in the packet and knows which port is destined for a packet. As such, the ingress port and the egress ports of a broadcast adapter must be connected to switches. Therefore, a packet traveling through the system, from end to end (or master to slave/target), has to be decoded, routed, and encoded at each switch level in the system. So at a minimum, this decoding, routing, and encoding must occur twice before a data packet can reach the destination.

Figure 4:
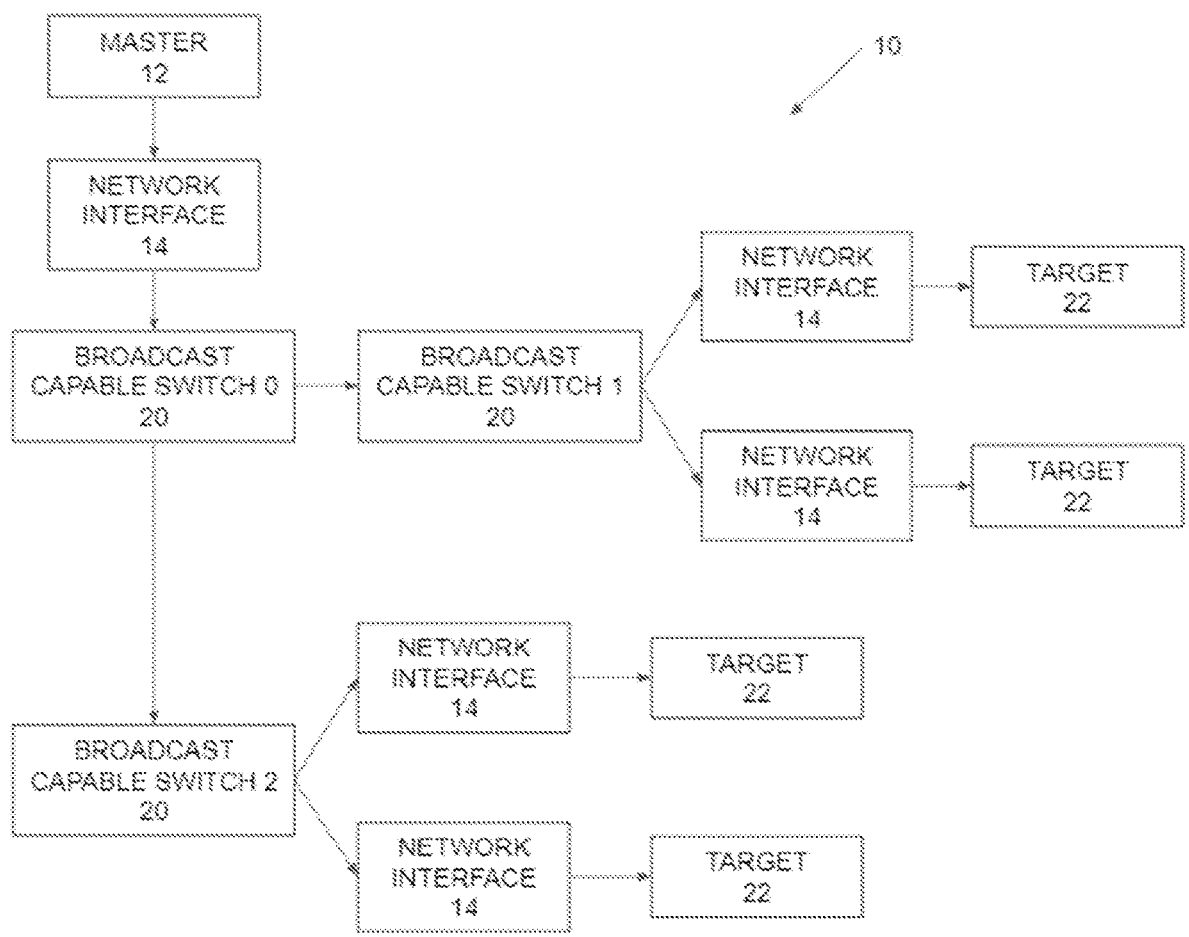
FIG. 4 illustrates a network-on-chip with a master and multiple slaves in accordance with the aspects and embodiments of the invention.
Figure 5:
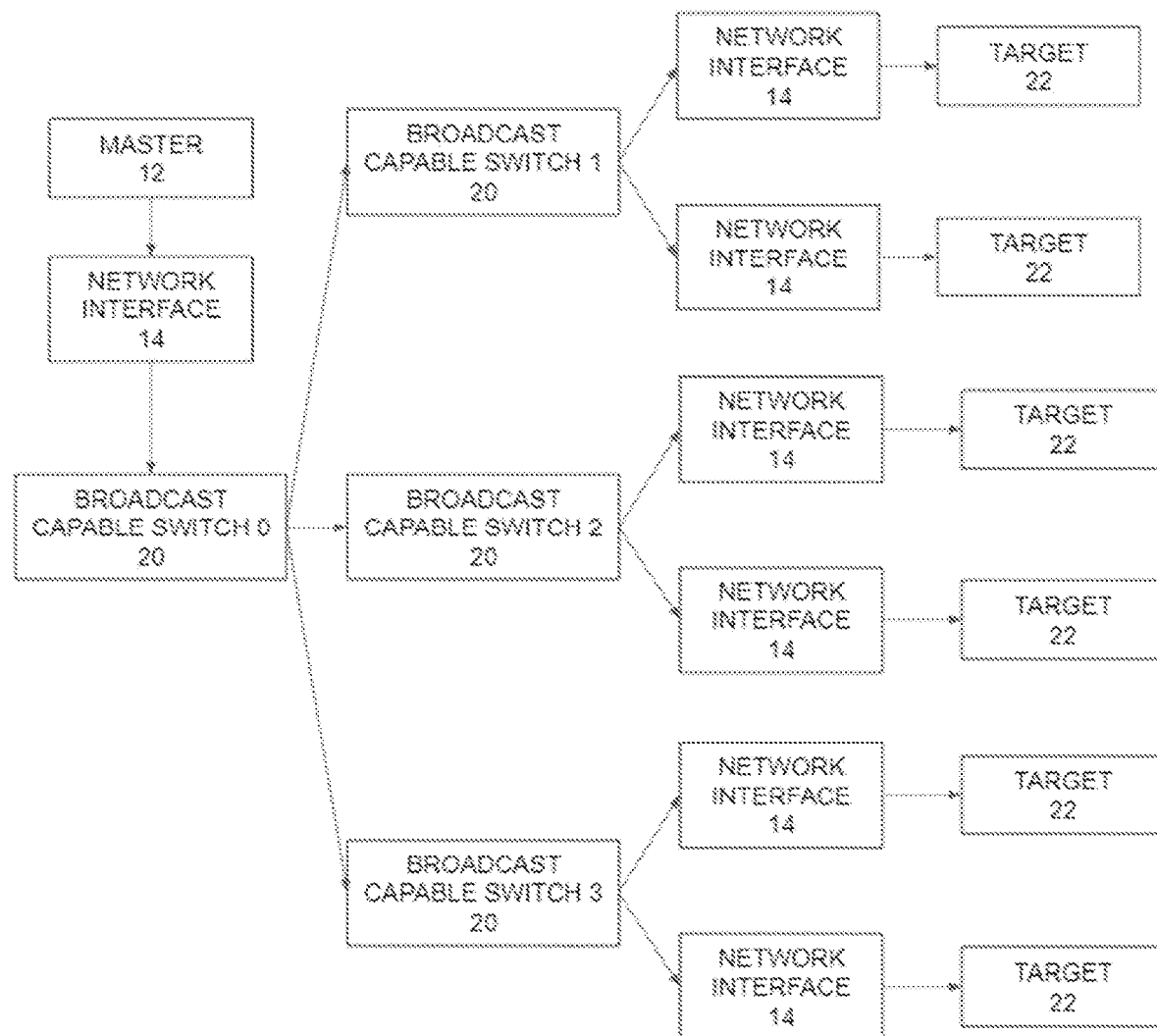
FIG. 5 illustrates a NoC with a master and multiple slaves in accordance with the aspects and embodiments of the invention.
Figure 6:
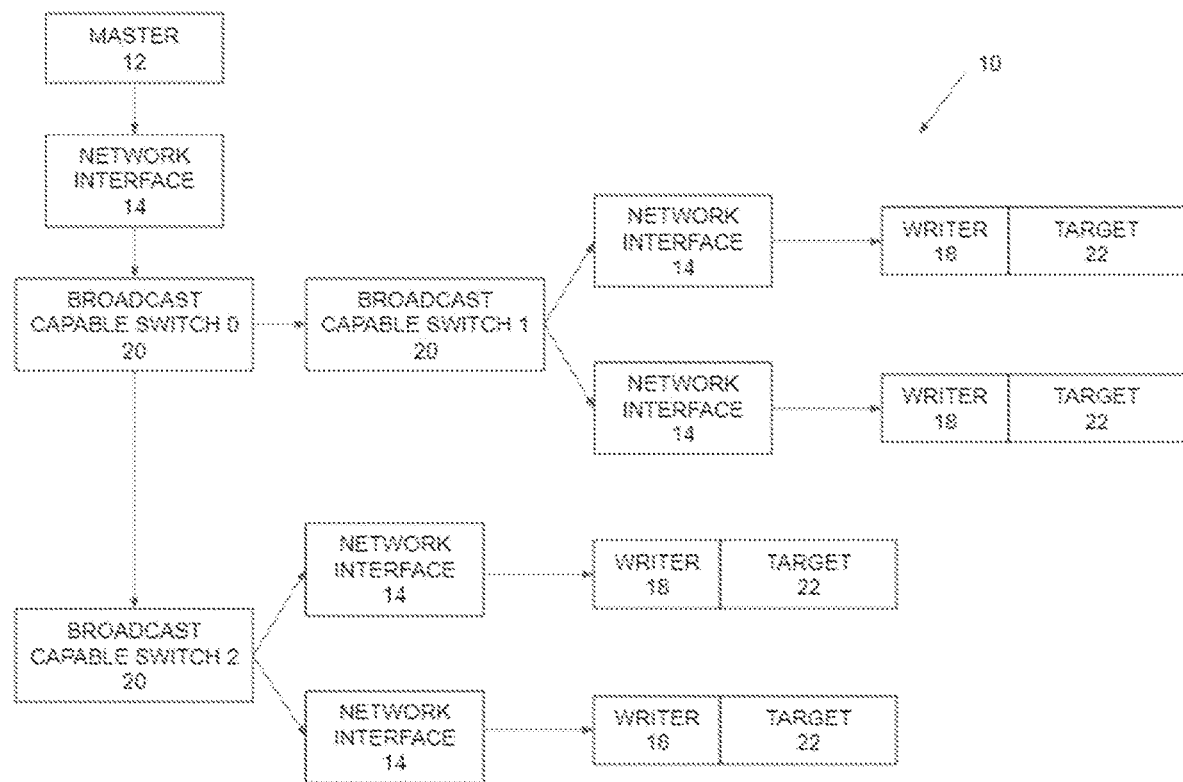
FIG. 6 illustrates a NoC with a master and multiple slaves, which also shows integration of a plurality of writers, in accordance with the aspects and embodiments of the invention.
Figure 7:
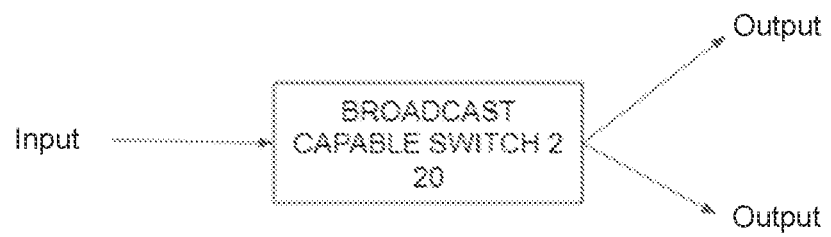
FIG. 7 illustrates an embodiment of a broadcast switch showing an ingress and at least one egress in accordance with the aspects and embodiments of the invention.
Figure 8:
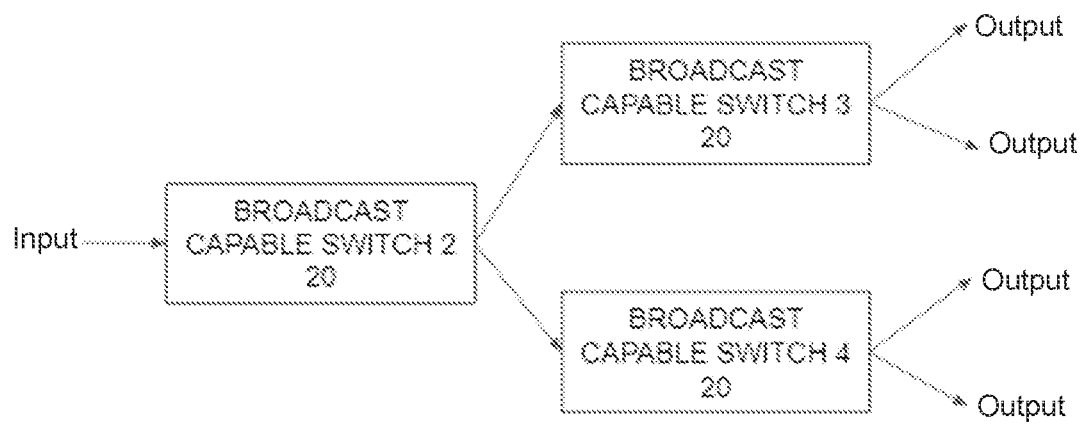
FIG. 8 illustrates an embodiment of a plurality of broadcast switches arranged, such that stringing together multiple broadcast switches may enhance the functionality, in accordance with the aspects and embodiments of the invention.
Figure 9:
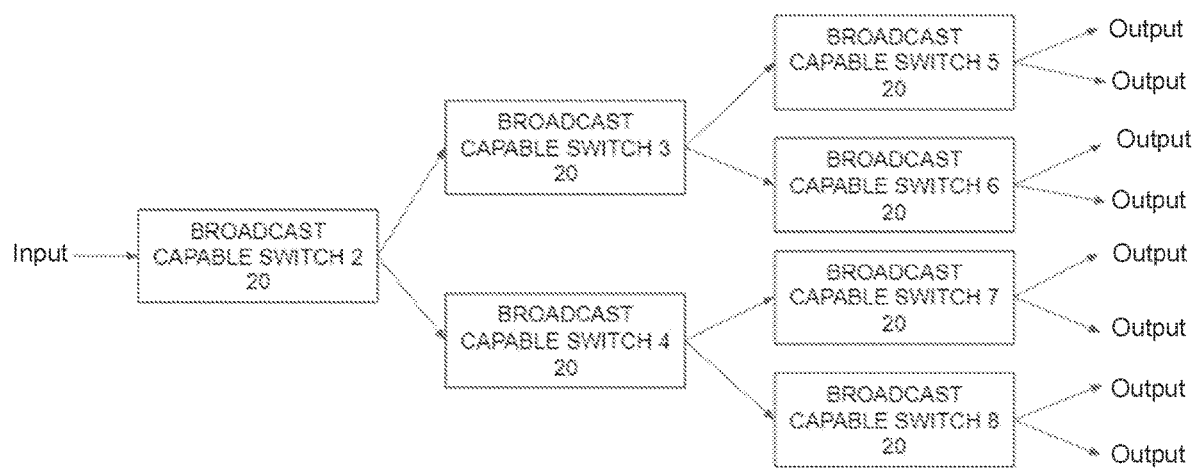
FIG. 9 illustrates an embodiment of a plurality of broadcast switches arranged such that stringing together multiple broadcast switches may enhance the functionality of an embodiment as is shown in the invention.
Figure 10:
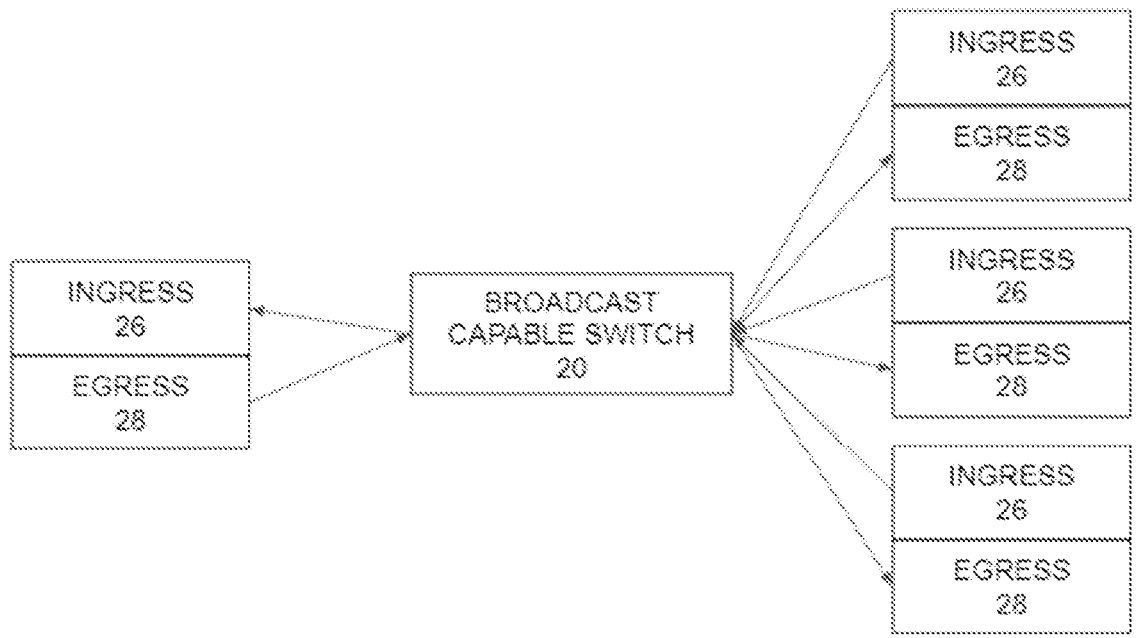
FIG. 10 illustrates an embodiment of a broadcast switch showing an ingress and at least one egress in accordance with the aspects and embodiments of the invention.
Figure 11:
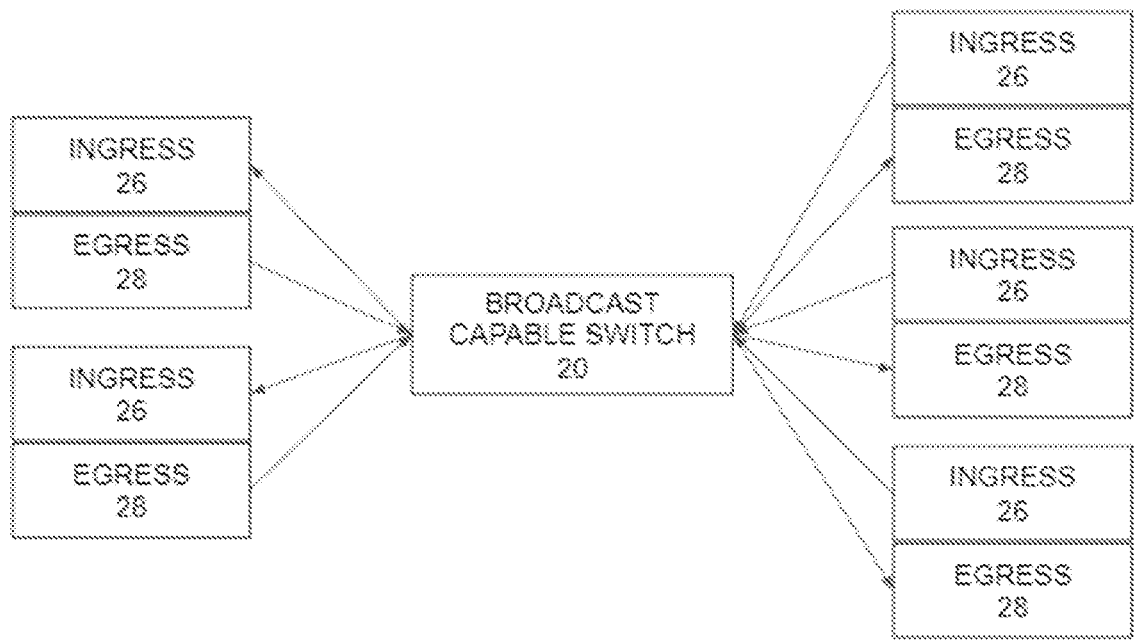
FIG. 11 illustrates an embodiment of a broadcast switch showing an ingress and at least one egress in accordance with the aspects and embodiments of the invention.

The invention, in accordance with various aspects and embodiments, provides these functionalities, systems and solutions in the following general manner. With reference to FIG. 4 as disclosed herein, a broadcast switch (0) 20 connects other broadcast switches (1 and 2) 20 to a master 12 using network interface unit (NIU) 14. There is also a NIU 14 between the broadcast switch (1) 20 and a target 22. The broadcast switch can perform all the functionality for both an adapter and various switches. Further, the target 22 is in communication with (can receive transactions from) the broadcast switch 20 (as shown) as well as other sources through other network elements (not shown for clarity). As such, there are routes that connect a target to the broadcast switches for receiving multi-cast transactions and there are routes (not shown) connected to the target for receiving normal transactions.

The master 12 sends transaction to the broadcast switch, such as broadcast switch 20. The transactions include information that tells the broadcast switch if the transaction is a multicast transaction or a normal transaction (i.e. intended for just one target or destination). In accordance with some aspects and embodiments of the invention, the broadcast switch acts a normal switch based on the information in the incoming packet (transaction) that identifies the incoming packets as a normal transaction. In accordance with some embodiments of the invention, the broadcast switch connects directly to any IP block. In this way, the broadcast switch can compute the route and modify the route field in the packet and/or data packet. Additionally, the broadcast switch is capable of determining routes to a destination. Thus, the broadcast switch includes the ability to mask out any one or more of the targets, to which it is capable of broadcasting, based on information contained in transaction (the incoming request).

In accordance with some aspect and embodiment of the invention, the broadcast switches that have more than one egress port can select any of one or more of the egress ports, from among all the egress ports, that will receive a broadcast of the packet and/or data packet. In accordance with some aspect and embodiment of the invention, the broadcast switches that have one egress port can select any of one or more of the destinations (targets), from among all the possible targets to which it can broadcast using the egress port, that will receive a broadcast of the packet and/or data packet. Masking is based on information provided a request (broadcast packet) that is received at a broadcast switch. The request includes information about masking. The information is used by the broadcast switch to mask out (prevent broadcasting to) specific target(s) from a fixed set of targets, which are associated with a broadcast tree for that broadcast switch.

In the arrangement shown, system 10 provides these advantages and more in the following way. When a packet and/or data packet is broadcast from the master 12, the broadcast switch looks up a target path route table using the target identification in a request packet to retrieve the route to the target from the broadcast switch. In this way, the route for the packet is put in the request packet going out to the target (also known as parallel lookup function, which can operate independently of transmission order).

Following the lookup, or simultaneously and in parallel, of the target path route table, the broadcast switch 20 determines and/or looks up the target path port table using the target identification. This is also done in a request packet to retrieve the egress port number of the broadcast switch 20. In this way, the request packet going out to the target is sent to the egress port as indicated in the target identification of the target path port table. One advantage is that this feature allows the request packets going to multiple targets to be sent via the same egress port.

As another arrangement, and disclosed herein, the target path route table and the target path port table can be set up such that the broadcast switch can broadcast the packet and/or transaction to multiple destinations via the same egress port. This novel feature and novel capability is advantageous for many reasons. One reason this novel feature is advantageous is because in some situations, the number of egress ports of the broadcast switch are less than the number of destinations. In this way, the utilization of and efficiency of an egress port greatly appreciates due to the organizational characteristics of the broadcast switch.

Following the lookup, or simultaneously and in parallel, of the target path route table and the target path port table, the broadcast switch determines and/or looks up the source path route table using the source identification in the response packet. The broadcast switch uses the source path route table and source identification to determine the route to the source from the broadcast switch. In this way, the route is put in the response packet going out to the source.

Once the broadcast switch determines the target path route table, the target path port table, and the source path route table, the broadcast switch performs the routing function of a switch for the request path and the response path.

Referring now to FIG. 5, FIG. 6, FIG. 7, FIG. 8, FIG. 9, FIG. 10, FIG. 11, and FIG. 13 In the arrangement shown, as one example, system 10 performs these functionalities as described in the methods herein, in a novel way, and various components, functionalities, and features to carry out these functions. Some of these components (as are further described herein) may include a master 12, a NIU 14, a queue, a transaction, a writer 18, a broadcast switch 20, a slave 22 (or "target"), an ingress port 26, an egress port 28, a broadcast capable switch ("BCS") address range 30, a BCS address 32, a slave address range 34 (or "target address range"), a slave address 36 (or "target address"), a buffer 40, a target path route table, a target path port table, a source path route table, and other various features, components and functionalities. Furthermore, system 10 includes various pipeline elements, in accordance with various embodiments of the invention, some of which are shown and some of which are not shown in the arrangements herein.

In accordance with the various aspects and embodiments of the invention, as one example, system 10 includes master 12. Master 12 (also known as "initiator", a "source," or a "sender") is formed of any suitable size, shape, and design and is configured to create and/or send packets and/or data packets and/or send data transmissions. In the arrangement shown, as one example, an initiator may be a computer, CPU, or server, or the like, which refers to an internet protocol module or unit. The primary purpose of the master 12, as disclosed herein, is to create and/or send the data packet and potentially provide other information related to the transmission being broadcast.

In the arrangement shown, as one example, the master 12 is in communication with the NIU 14 (to be further discussed herein). Subsequently, the NIU 14 is connected to a plurality of slaves (or "targets") 22 (to be further discussed herein). In this way, the master 12 is enabled to send transactions to multiple slaves 22.

While a single master is discussed herein, as one example, it will be apparent that many other embodiments are contemplated, which include multiple masters and multiple slaves, even though only one master and several slaves are shown for clarity in this example; for ease of explanation.

In accordance with the various aspects and embodiments of the invention, one master may send a transaction or request to multiple slaves 22. Furthermore, a master 12 may send a request to a slave 22, using an address to select the slave 22. Furthermore, the master 12 may write the same data to multiple different slaves 22.

In accordance with the various aspects and embodiments of the invention, in the arrangement shown as an example, system 10 includes a plurality of slaves 22. Slaves 22 (or "targets") are formed of any suitable size, shape, and design and are configured as target addresses and/or target internet protocols which are set up to receive transactions (to be further discussed herein) from a master via the pipeline discussed herein.

In accordance with the various aspects and embodiments of the invention, the plurality of slaves 22 are, each or alone, in communication with the NIU 14 (to be further discussed herein). Subsequently, the NIU 14 is connected to a plurality of masters 12. In this way, the target 22 is enabled to receive transactions from one master or multiple masters 12.

While a single target 22 is discussed on occasion herein, as one example, it will be apparent that many other embodiments are contemplated, such as two targets, three targets, four targets, any other number of targets and multiple masters, even though only one master and one target might be shown for clarity in this example; for ease of explanation. Said another way, one master may send a transaction or request to multiple slaves 22. Furthermore, a master 12 may send a request to a slave 22, using an address to select the slave 22. Furthermore, the master 12 may write the same data to multiple different slaves 22. In the arrangement shown, as one example, system 10 includes a plurality of transactions. Transactions are formed of any suitable size, shape, and design, and is a term used to describe data that is being broadcast by the master 12 and/or data that is being requested by the master 12.

In the arrangement shown, as one example, one or a plurality of masters 12 may send a transaction and/or request a transaction to or from multiple slaves 22. Furthermore, a master 12 may send a transaction request to a slave 22, using an address to select the slave 22. Furthermore, the master 12 may write the same data to multiple different slaves 22.

In the arrangement shown, as one example, arriving and departing transactions may come from various addresses, sources, with varying priorities. Additionally, and in the arrangement shown, arriving and departing transactions may come from AXI, ACE lite, CHI, and may carry a quality of service field and various other identifiers which can be used to determine the requirements and/or goals.

In accordance with the various aspects and embodiments of the invention, system 10 includes a network interface unit (NIU) 14 (or "network interface"). NIU 14 is formed of any suitable size, shape, and design and is configured as the point of interconnection between a master 12 (or simply a computer) and a private or public network. In accordance with the various aspects and embodiments of the invention, a network interface may be a network interface card and need not have a physical form. In this way, an implemented software is also hereby considered as a NIU 14.

Additionally, and in the arrangement shown, system 10 may also include network interface units 14 located on the slave and/or target 22 side. In this way, a plurality of network interface units 14 may be connected to slaves 22 and are used to convert the protocols used inside the NoC to the protocols used by the targets 22. In this way, the network interface units 14 enable the master 12 to communicate through the system 10 with a plurality of slaves 22.

Said another way, the network interface units 14 translate the incoming transactions, formed by the master 12, to the protocol used inside the NoC, for transport. In the arrangement shown, as one example, the NIU 14 is in communication with the master 12, with the broadcast switch 20 and potentially other various pipeline elements, in accordance with various embodiments of the invention, some of which are shown and some of which are not shown.

In accordance with the various aspects and embodiments of the invention, the system 10 includes a broadcast switch 20. Broadcast capable switch 20 (also known as "broadcast switch") is formed of any suitable size, shape, and design and is configured to receive a transaction (and/or a packet representing a request and/or request transaction). The broadcast switch 20 is configured to duplicate the packet, send the packet duplicates to each request egress port (to be further discussed herein). Broadcast switch 20 may handle a request packet of data, which represents a transaction, arriving at an ingress port (to be further discussed herein). The packet is duplicated by the broadcast switch, as needed, and depending on the request type and the duplicates are sent as packets through various egress ports.

In accordance with the various aspects and embodiments of the invention, the broadcast switch 20 may handle a packet which arrives at an ingress port by duplicating, then receiving a communication through a network interface to a slave 22, and subsequently sending additional communications through a second or third network interface which is similar along a second or third path.

In this way, the broadcast switch 20 handles broadcast adapter functionality as well as broadcast switch functionality within a single building block. These and other methods are hereby contemplated for use. The example discussed above is one of many processes and or transactions that can be handled by a broadcast switch 20.

For another example, a broadcast switch 20 can connect directly to other network interfaces, other broadcast adapter, and/or other switches because the broadcast switch computes the route and modifies the route field in the packet, and can determine which port is the port destined for the relative transaction 22.

Said another way, a broadcast switch 20 can connect to the master 12 and slave 22 network interface. The connection travels through the broadcast switch 20. The broadcast switch 20 is allowed to compute the route and modify the route field in the transaction and, hence, knows port, for which, the transaction is intended. In this way, the ingress port and the egress ports of the broadcast switch can be decoded, routed, and encoded within the broadcast switch.

Figure 2:
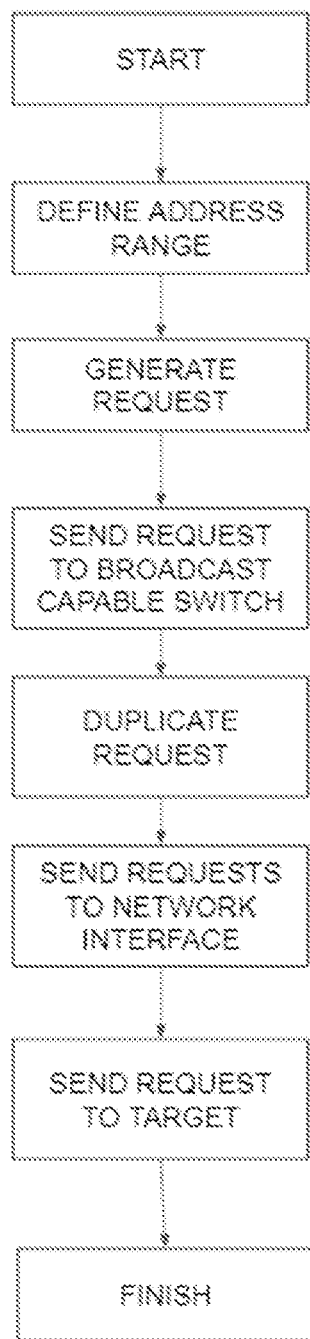
FIG. 2 illustrates a flow process for broadcasting a request from a master to multiple slaves using a broadcast switch in accordance with the aspects and embodiments of the invention.
Figure 3:
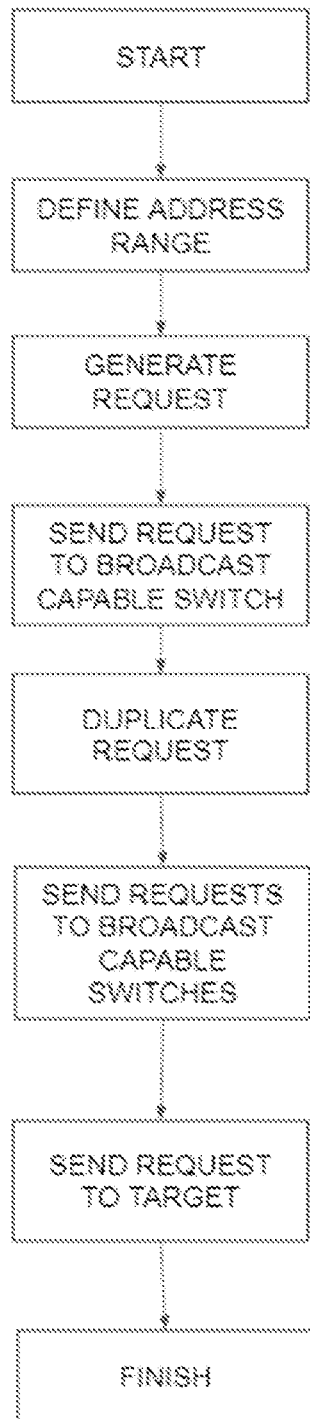
FIG. 3 illustrates a flow process for broadcasting a request from a master to multiple slaves using a broadcast switch in accordance with the aspects and embodiments of the invention.

Referring to FIG. 1, FIG. 2, and FIG. 3, in accordance with the various aspects and embodiments of the invention, a process is shown wherein the broadcast switch 20 performs both the functions of a broadcast adapter and a broadcast switch. The broadcast switch 20 looks up a target path route table using the target identification in a request packet to retrieve the route to the target front of (down path) the broadcast switch. This route is put in the request packet going out to the target.

The broadcast switch 20 looks up a target path port table using the target identification in a request packet to retrieve the egress port number of the broadcast switch. The request packet going out of the target is sent to the egress port as indicated. Furthermore, this feature allows the request packets to go to multiple targets and to be sent via the same egress port.

In accordance with the various aspects and embodiments of the invention, the target path route table and the target path port table are set up, in the arrangement shown as one example, such that the broadcast switch 20 can broadcast a transaction to multiple destinations (or targets) via the same egress port. In the arrangement shown, as one example, this functionality is useful when the number of egress ports of the broadcast switch 20 are less than the number of targets 22.

Subsequently, the broadcast switch 20 looks up a source path route table using the source identification in a response packet to retrieve the route to the source from the broadcast switch 20. In this way, the route is placed as part of the response packet going out to the source. With the target path route table, target path port table, and the source path route table, the broadcast switch 20 performs broadcast adapter functions and, simultaneously, the routing functions of a plurality of switches for the request path and the response paths.

In accordance with the various aspects and embodiments of the invention, as one example, broadcast switch 20 includes an ingress port 26 and egress ports 28. Ingress port 26 is formed of any suitable size, shape, and design and is configured as the pipeline on the request side of the transaction. Egress port 28 is formed of any suitable size, shape, and design and is generally configured as the port or ports through which the broadcast switch 20 will send transactions and/or duplicate transactions through.

Figure 12:
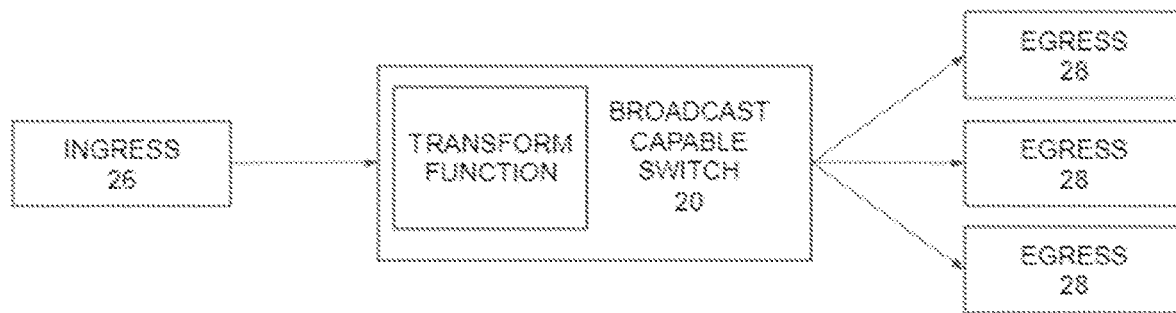
FIG. 12 illustrates an embodiment of a system, which shows a broadcast switch with an integrated transform function, in accordance with the aspects and embodiments of the invention.
Figure 13:
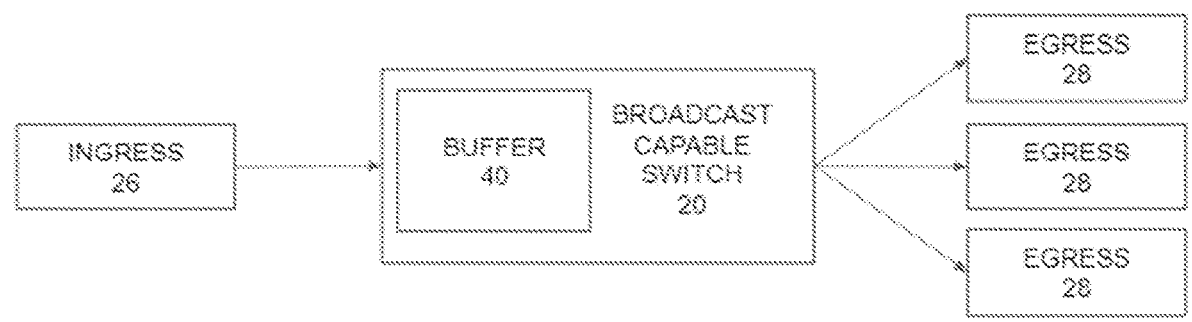
FIG. 13 illustrates an embodiment of a system, which includes a broadcast switch with at least one buffer integrated into the broadcast switch, in accordance with the aspects and embodiments of the invention.
Figure 14:
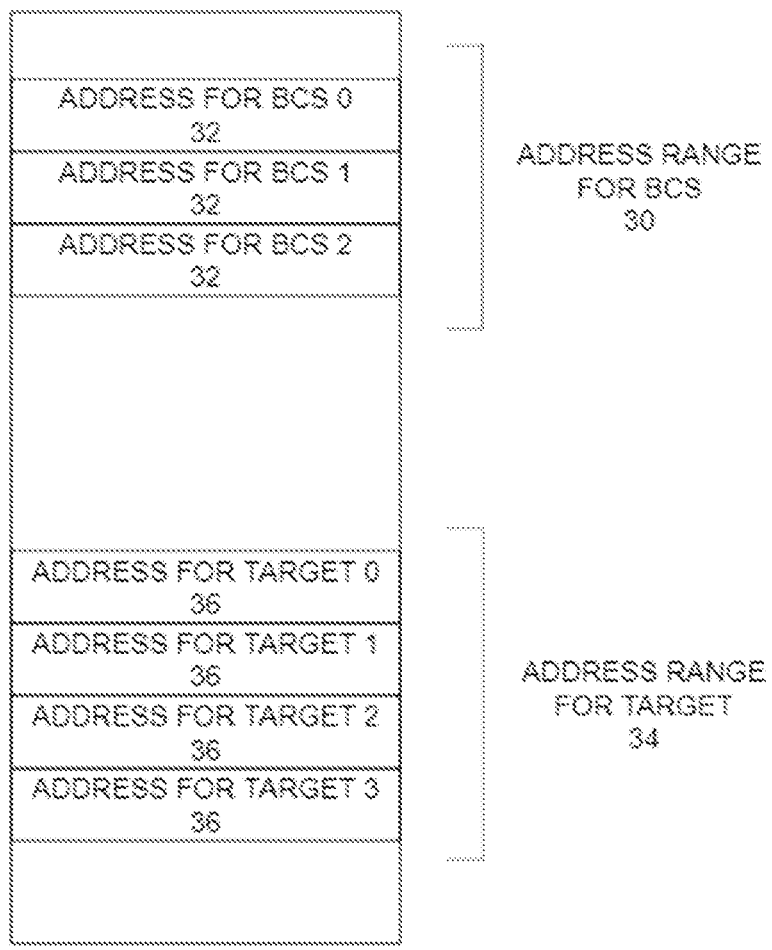
FIG. 14 illustrates an embodiment of the system and a broadcast switch channel range and special channel for various broadcast switch addresses and target addresses in accordance with the aspects and embodiments of the invention.

In this way, and as discussed herein, the broadcast switch 20 duplicates transactions received on the ingress port and sends the duplicated transactions in the network using the egress ports. Referring to the figures, as an example, a broadcast switch 20, of FIG. 12, is shown configured with one ingress port 26 and three request egress ports 28. Similarly, the figures also represent (not shown) three response ingress ports and one response egress port, to handle a response coming from all targets connected to the request egress ports in accordance with various aspects and embodiments of the invention. In the arrangement shown, as one example, various embodiments are shown, various amounts of ingress and egress ports are contemplated for use. Furthermore, the broadcast switch 20 may perform response aggregation and/or combine all the responses that correspond to one duplicate and/or more duplicate request packets, into a single response packet using a combination function. The combined responses may be sent and/or requested through various ports.

In accordance with the various aspects and embodiments of the invention, system 10 and more specifically, the broadcast switch 20 may include a buffer 40. Buffer 40 is formed of any suitable, size, shape and design and is configured to permit independent progress of each egress port without having to implement one first in, first out per egress port. In this way, the broadcast switch 20 is able to implement a complex broadcast network while avoiding deadlocks, latency, or drop.

In accordance with the various aspects and embodiments of the invention, system 10 also includes a pipeline, which may also be referred to as a path. Path is formed of any suitable size, shape, and design, and is configured as a dynamically situated pipeline for the purpose of providing transmission and networking on chip. Path or plurality of paths may also simply be known as a pipeline through which the data and/or data packets, in the arrangement, travels and interacts with the system 10 herein. Furthermore, system 10 may include additional switches and/or broadcast adapters and the like.

As one example, a system and method are presented in this invention for the purpose of providing transmission broadcasting for a single target and single broadcast, as well as for a single target on a multi-broadcast, as well as, multi-target on multi-broadcast, and additionally through tree building utilizing a plurality of broadcast switches.

In accordance with the various aspects and embodiments of the invention, which is shown in FIG. 1 through FIG. 14, a first broadcast switch connects other broadcast switches. In this way, the broadcast switch can perform all the functionality as previously needed for both an adapter and various switches. In this way, the broadcast switch can connect directly to and compute the route and modify the route field in the packet and/or data packet. In this way, the broadcast switch knows which port is destined for a packet and/or data packet.

In the arrangement shown, system 10 provides these advantages and more in the following way. When a packet and/or data packet is broadcast from the master, the broadcast switch looks up a target path route table using the target identification in a request packet to retrieve the route to the target from the broadcast switch. In this way, the route for the packet is put in the request packet going out to the target (also known as parallel lookup function, which can operate independently of transmission order).

Following the lookup, or simultaneously and in parallel, of the target path route table, the broadcast switch determines and/or looks up the target path port table using the target identification. This is also done in a request packet to retrieve the egress port number of the broadcast switch. In this way, the request packet going out to the target is sent to the egress port as indicated in the target identification of the target path port table. As one advantage, this feature allows the request packets going to multiple targets to be sent via the same egress port.

As another arrangement, and disclosed herein, the target path route table and the target path port table can be set up such that the broadcast switch can broadcast the packet and/or transaction to multiple destinations via the same egress port. This novel feature and novel capability is advantageous for many reasons. One reason this novel feature is advantageous is because in some situations, the number of egress ports of the broadcast switch are less than the number of destinations. In this way, the utilization of and efficiency of an egress port greatly appreciates due to the organizational characteristics of the broadcast switch.

Following the lookup, or simultaneously and in parallel, of the target path route table and the target path port table, the broadcast switch determines and/or looks up the source path route table using the source identification in the response packet. The broadcast switch uses the source path route table and source identification to determine the route to the source from the broadcast switch. In this way, the route is put in the response packet going out to the source.

Once the broadcast switch determines the target path route table, the target path port table, and the source path route table, the broadcast switch performs the routing function of a switch for the request path and the response path.

These and other methods of use and processes are hereby contemplated for use. For example, parallel processing can provide tremendous speedups. This is important for applications such as deep neural networks computations, which can require distribution of the same dataset to multiple nodes simultaneously. In accordance with some aspects of the invention, designers of neural network solutions can take advantage of the broadcast switches 20 for implementing transaction completion in parallel or simultaneously. For example, various aspects and embodiments of the invention can be implemented in the field of artificial intelligence computations and deep network accelerators. When implemented in hardware and software, such systems can take full advantage of the parallelism of broadcasting using a NoC that includes broadcast switches 20 and run orders of magnitude faster.

Certain examples have been described herein and it will be noted that different combinations of different components from different examples may be possible. Salient features are presented to better explain examples; however, it is clear that certain features may be added, modified and/or omitted without modifying the functional aspects of these examples as described.

Various examples are methods that use the behavior of either or a combination of machines. Method examples are complete wherever in the world most constituent steps occur. For example and in accordance with the various aspects and embodiments of the invention, IP elements or units include: processors (e.g., CPUs or GPUs), random-access memory (RAM—e.g., off-chip dynamic RAM or DRAM), a network interface for wired or wireless connections such as ethernet, WiFi, 3G, 4G long-term evolution (LTE), 5G, and other wireless interface standard radios. The IP may also include various I/O interface devices, as needed for different peripheral devices such as touch screen sensors, geolocation receivers, microphones, speakers, Bluetooth peripherals, and USB devices, such as keyboards and mice, among others. By executing instructions stored in RAM devices processors perform steps of methods as described herein.

Some examples are one or more non-transitory computer readable media arranged to store such instructions for methods described herein. Whatever machine holds non-transitory computer readable media comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

It will be appreciated by those skilled in the art that other various modifications could be made to the device without parting from the spirit and scope of this invention (especially various programmable features). All such modifications and changes fall within the scope of the claims and are intended to be covered thereby. Furthermore, practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "couple" or "communicatively coupled" have an effectual relationship realizable by a direction connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-field protocols, or radio frequency identification (RFID).

The scope of the invention, therefore, is not intended to be limited to the exemplary embodiments shown and described herein. Rather, the scope and spirit of the invention is embodied by the claims.

What is claimed is:

1. A method for broadcasting a transaction from a master to a plurality of targets comprising the steps of:
defining a special address range, wherein each address in the special address range corresponds to one broadcast switch having at least one ingress port in communication with the master and a plurality of egress ports;
receiving the transaction at one address in the special address range;
duplicating, at a broadcast switch located at the one address, the transaction to generate a plurality of duplicated transactions, wherein quantity of the plurality of duplicated transactions is at least equal to total number of the plurality of egress ports;
sending one duplicated transaction to one egress port of the plurality of egress ports thereby causing all of the plurality of egress ports to receive at least one duplicated transaction; and
receiving, at each of the plurality of targets, one duplicated transaction of the plurality of duplicated transactions thereby allowing the master to simultaneously send the transaction to each of the plurality of targets with a single transmission of the transaction to one address.

2. A method for broadcasting a transaction from an initiator to a plurality of targets, the method comprising the steps of:
defining a special address range, wherein each address in the special address range corresponds to one broadcast switch having at least one ingress port in communication with the initiator and a plurality of egress ports that are in communication with a set of targets selected from the plurality of targets;
receiving the transaction that is sent to a first address in the special address range;
duplicating, at a first broadcast switch, the transaction to generate a plurality of duplicated transactions;
sending a duplicated transaction to one egress port of the plurality of egress ports;
buffering a first duplicated transaction intended for a first egress port of the plurality of egress ports when the first broadcast switch has fewer egress ports than destinations to which the first broadcast switch is broadcasting; and
receiving, at each of the set of targets selected from the plurality of targets, one duplicated transaction thereby allowing the initiator to send one transaction to the first broadcast switch and having the one transaction delivered to the set of targets selected from the plurality of targets thereby resulting in a single transmission from the initiator that reaches the set of targets selected from the plurality of targets.

3. The method of claim 2 further comprising:
receiving a plurality of response, one at each of a plurality of response ingress ports of the first broadcast switch, one from each of the set of targets selected from the plurality of targets;
combining, at the first broadcast switch, the plurality of response into first response; and
sending, using a response egress port of first broadcast switch, the first response to the initiator.

4. A method comprising:
receiving, from an initiator, a transaction at a first address in a special address range, wherein each address in the special address range represents a request ingress port of a broadcast switch;
duplicating, at the broadcast switch that duplicates any transaction received at the request ingress port, the transaction to generate a plurality of duplicated transactions, wherein quantity of the plurality of duplicated transactions is at least equal to total number of a plurality of egress ports of the broadcast switch; and
providing one duplicated transaction of the plurality of duplicated transactions to one egress port of a plurality of egress ports of the broadcast switch thereby causing all of the plurality of egress ports to receive at least one duplicated transaction and allowing the initiator to have the transaction delivered to all of a plurality of targets, which results from a single transmission from the initiator to the broadcast switch forward the transaction to the plurality of targets.

5. The method of claim 4 further comprising:
receiving a plurality of response, one at each of a plurality of response ingress ports of the broadcast switch, one from each of the plurality of targets;
combining, at the broadcast switch, the plurality of response into first response; and
sending, using a response egress port of first broadcast switch, the first response to the initiator.

6. The method of claim 1 further comprising:
receiving a plurality of response, one at each of a plurality of response ingress ports of the broadcast switch, one from each of the plurality of targets;
combining, at the broadcast switch, the plurality of response into first response; and
sending, using a response egress port of first broadcast switch, the first response to the master.

* * * * *